(12) United States Patent
Wiemann et al.

(10) Patent No.: US 8,799,791 B2
(45) Date of Patent: Aug. 5, 2014

(54) SYSTEM FOR USE IN EDITORIAL REVIEW OF STORED INFORMATION

(75) Inventors: Scott Harvey Wiemann, Lakeville, MN (US); Timothy Matthew Dean, Minneapolis, MN (US); Richard Nicholas Dauk, Apple Valley, MN (US)

(73) Assignee: Thomson Reuters Global Resources, Baar (CH)

( * ) Notice: Subject to any disclaimer, the term of this patent is extended or adjusted under 35 U.S.C. 154(b) by 485 days.

(21) Appl. No.: 12/751,541

(22) Filed: Mar. 31, 2010

(65) Prior Publication Data

US 2011/0246912 A1 Oct. 6, 2011

(51) Int. Cl.
*G06F 3/00* (2006.01)

(52) U.S. Cl.
USPC .......................................................... 715/760

(58) Field of Classification Search
None
See application file for complete search history.

(56) References Cited

U.S. PATENT DOCUMENTS

| | | | | |
|---|---|---|---|---|
| 6,697,821 B2* | 2/2004 | Ziff et al. | ...................... | 707/706 |
| 7,007,232 B1* | 2/2006 | Ross et al. | ...................... | 715/208 |
| 7,793,258 B2* | 9/2010 | Sundararajan et al. | ....... | 717/109 |
| 7,870,577 B2* | 1/2011 | Haberman et al. | ............... | 725/35 |
| 8,078,451 B2* | 12/2011 | Dolan et al. | ...................... | 704/9 |
| 8,195,666 B2* | 6/2012 | Jeavons | ........................ | 707/738 |

(Continued)

FOREIGN PATENT DOCUMENTS

WO WO97/12334 4/1997
WO WO2006/083241 8/2006

(Continued)

OTHER PUBLICATIONS

Notification of Transmittal of the International Search Report and the Written Opinion of the International Searching Authority, or the Declaration for PCT/US2011/030162, international filed Mar. 28, 2011; 10 pages.

(Continued)

*Primary Examiner* — Stephen Alvesteffer
(74) *Attorney, Agent, or Firm* — Faegre Baker Daniels LLP

(57) ABSTRACT

A system for use in editorial review of stored information includes a web interface adapted to provide a graphical user interface to a user. A first application component is adapted to run in the web interface. The first application component includes a first user interface component adapted to present information to a user and receive editorial content related to the information from the user. A first database communication component is adapted to communicate with a database containing the stored information and editorialize the stored information in the database in response to the editorial content received from the user. A first communication component is adapted to communicate within the web interface in response to the editorial content received from the user. A second application component is adapted to run in the web interface. The second application component includes a second user interface component adapted to present information to the user and receive editorial content related to the information from the user. A second communication component is adapted to communicate with first communication component. A second database communication component communicates with the database containing the stored information based upon data received from the first application component in response to the editorial content received from the user.

20 Claims, 6 Drawing Sheets

(56) References Cited

U.S. PATENT DOCUMENTS

| | | | |
|---|---|---|---|
| 2002/0065677 A1 | 5/2002 | Grainger et al. | |
| 2002/0073121 A1* | 6/2002 | Sano et al. | 707/517 |
| 2004/0006743 A1* | 1/2004 | Oikawa et al. | 715/513 |
| 2005/0203899 A1* | 9/2005 | Anderson et al. | 707/5 |
| 2006/0064434 A1 | 3/2006 | Gilbert et al. | |
| 2006/0069685 A1 | 3/2006 | Dickens et al. | |
| 2006/0173985 A1* | 8/2006 | Moore | 709/223 |
| 2006/0200756 A1* | 9/2006 | Politi et al. | 715/513 |
| 2006/0206490 A1 | 9/2006 | Schiller | |
| 2007/0113169 A1 | 5/2007 | Gugerbauer | 715/512 |
| 2008/0033929 A1* | 2/2008 | Al-Kofahi et al. | 707/5 |
| 2009/0006953 A1* | 1/2009 | Perantatos et al. | 715/700 |
| 2009/0150168 A1 | 6/2009 | Schmidt | |
| 2009/0150906 A1 | 6/2009 | Schmidt et al. | |
| 2009/0249223 A1* | 10/2009 | Barsook et al. | 715/753 |
| 2010/0100572 A1* | 4/2010 | Schiller | 707/805 |
| 2011/0029525 A1 | 2/2011 | Knight | |
| 2011/0246532 A1 | 10/2011 | Wiemann | |

FOREIGN PATENT DOCUMENTS

| | | |
|---|---|---|
| WO | WO2007/041688 | 4/2007 |
| WO | WO2011123384 A1 | 10/2011 |
| WO | WO2011123385 A1 | 10/2011 |

OTHER PUBLICATIONS

1. Anonymous, Surrogate Key, published 2003, ITtoolbox, p. 1 -2.

Communication issued in EP Application No. 11717358.3, mailed Nov. 8, 2012, 2 pages.

Communication issued in EP Application No. 11717796.4, mailed Nov. 8, 2012, 2 pages.

Final Office Action issued in U.S. Appl. No. 12/751,554, mailed Nov. 6, 2012, 16 pages.

International Search Report and Written Opinion issued in PCT/US2011/030160, mailed Jul. 7, 2011, 12 pages.

Non-Final Office Action issued in U.S. Appl. No. 12/751,554, mailed Jun. 20, 2012, 10 pages.

* cited by examiner

SYSTEM FOR USE IN EDITORIAL REVIEW OF STORED INFORMATION

CROSS-REFERENCE TO RELATED APPLICATIONS

This application is related to co-pending application Ser. No. 12/751,554, filed Mar. 31, 2010, and entitled SYSTEM FOR MANAGING ELECTRONICALLY STORED INFORMATION, the content of which is hereby incorporated by reference in its entirety.

BACKGROUND OF THE INVENTION

With the increased use of computers and web-based applications, increasing amounts of information are being made available to end users. As the costs of mass storage of data have decreased, and the speeds at which data can be obtained and transmitted have increased, the number of databases available to end users, and the size of those databases, have increased. Such databases are used to store a myriad of information. Typically, the stored information can be searched and retrieved by an end user via a user interface.

Specialized types of database are used to store information which has been subjected to some type of editorial review. For example, information related to legal proceedings is available through services known as Westlaw® and WestlawNext® provided by Thomson Reuters located in Eagan, Minn. In such services, judicial opinions (from various courts across the United States) are collected and published. The collected opinions are also summarized and classified based on the principles or points of law that they contain. For example, Thomson Reuters creates and classifies "headnotes" which are short summaries of points of law made in judicial opinions using a taxonomy. The taxonomy provided by Thomson Reuters is a hierarchical classification of over 20 million headnotes across more than 90,000 distinct legal topics. Each topic not only has a descriptive name, but also a unique number code known as its Key Number classification.

In addition to legal opinions, many other types of legal documents can be collected, stored, and subjected to editorial review (editorial review is also referred to herein as "editorializing" or "editing"). The process of collecting, storing and editorializing is an example of an editorial process. Exemplary legal documents include but are not limited to briefs filed in connection with a particular case, expert witness reports or testimony, depositions, filings related to particular motions and rulings on those motions, jury instructions, etc. In addition to information in document form, other types of data may be stored in connection with a judicial matter such as audio or videotapes of testimony or evidence, photographs, exhibits, written publications, computer recreations or exhibits, etc. As this raw information (referred to herein as "artifacts") is entered into a particular database, the information is subjected to editorial review in which the information is associated with data which identifies the case or matter to which that information pertains. Other types of editing may occur as well including adding summaries to the information, classifying the information, cross referencing the information with other data, etc.

The process of editorial review can be automated whereby incoming information is analyzed by software. Based upon the analysis, in many instances the software is capable of correctly editorializing the information. For example, a program is developed that compares an incoming docket number associated with an appellate opinion to existing docket numbers to determine if there is a match. If there is a match to an existing docket number associated with a trial court ruling, the software will relate the two docket numbers and their associated documents. In other instances the editorializing performed by the software needs to be reviewed and/or revised, or the software is not capable of accurately making an editorializing decision and a professional editor must manually review the information. For example, the automated process determined that an editor should review a change of metadata. In known systems, the editor has to remember every place where that piece of metadata needs to be populated. Additionally in the know systems, the editor has to utilize several different editing tools and/or applications in order to populate all the fields that need the updated metadata. The known editorial review process is very time consuming and requires the professional editor to utilize different editing tools with a high degree of accuracy. Consequently, the present inventors have recognized a need for improvement of a system by a professional editor for use in editorial review of stored information.

SUMMARY OF THE INVENTION

A system for use in editorial review of stored information includes a web interface or other application adapted to provide a graphical user interface to a user. A first application component is adapted to run in the web interface. The first application component includes a first user interface component adapted to present information to a user and receive editorial content related to the information from the user. A first database communication component is adapted to communicate with a database containing the stored information and editorialize the stored information in the database in response to the editorial content received from the user. A first communication component is adapted to communicate within the web interface in response to the editorial content received from the user. A second application component is adapted to run in the web interface. The second application component includes a second user interface component adapted to present information to the user and receive editorial content related to the information from the user. A second communication component is adapted to communicate with first communication component. A second database communication component communicates with the database containing the stored information based upon data received from the first application component in response to the editorial content received from the user.

DETAILED DESCRIPTION OF ILLUSTRATIVE EMBODIMENTS

This description, which references and incorporates the above-identified Figures, describes one or more specific embodiments of one or more inventions. These embodiments, offered not to limit but only to exemplify and teach the one or more inventions, are shown and described in sufficient detail to enable those skilled in the art to implement or practice the invention. Thus, where appropriate to avoid obscuring the invention, the description may omit certain information known to those of skill in the art.

The description includes many terms with meanings derived from their usage in the art or from their use within the context of the description. However, as a further aid, the following exemplary definitions are presented. An "artifact", for example, may refer to a document, or any addressable collection or arrangement of machine-readable data. The term "database", for example, may include a data collection or any logical collection or arrangement of artifacts. In addition, a database may include metadata and other data.

The present invention provides a system in which a user (typically, the user described herein is a professional editor) can perform an editorial review (i.e., "editorialize") of stored information through a web interface. The web interface provides a unified application and interface architecture and is configured to run a plurality of application components therein. As used herein, the term "unified architecture" refers to a software construct in which a standardized framework is provided for the implementation of application components and the exchange of information between such components. Use of a unified architecture has many advantages. First, it allows the implementation of a consistent graphical user interface across multiple application components. The application components are configured to interact with a user, communicate with one another, and interface with a remote database. Second, it provides an efficient framework for a developer to create new application components and provide a consistent user interface. Third, it reduces the time required to perform an editorial review process of stored information as the various application components within the web interface are configured to share data. As these application components are run at a client tier level, a new application is easily created by a developer without significant modification of software run on an application server which interfaces with the database.

Figure 1:
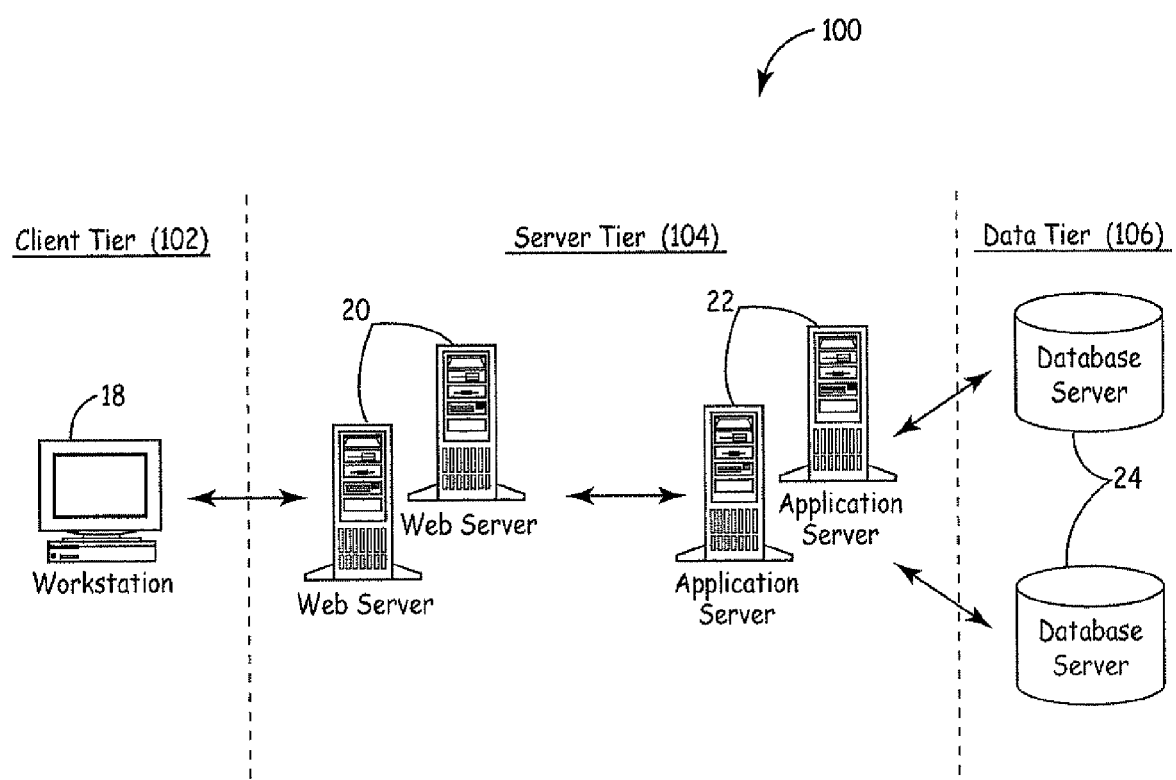
FIG. 1 is a diagram illustrating a client tier, server tier and data tier for use in one configuration of the present invention.

FIG. 1 is a schematic diagram of a system for editorial review of stored information which illustrates a client tier 102, web and application server tier 104 and a data tier 106. In FIG. 1, the client tier is illustrated as a work station 18. The work station 18 is configured to run a web interface and permit interaction with a user as described herein. The work station 18 is connected to server tier 104 over a network connection. In the embodiment shown in FIG. 1, the server tier 104 includes multiple servers, some of which are configured as web servers 20 and others which are configured as application servers 22. This functionality may be shared between servers or implemented individually as desired. The web servers 20 are configured to serve web pages to the work station 18 in accordance with standard communication and programming techniques. The web servers 20 are configured to provide application components to the work station 18 which are run within a web interface on the work station 18. Based upon interaction with the work station 18 by a user, the web servers 20 are configured to interact with the application servers 22. The application servers 22 shown in FIG. 1 are configured to read and write to one or more database servers 24 shown in the data tier 106. These database servers 24 contain various data collections, artifacts and/or metadata associated with the artifacts.

Figure 2:
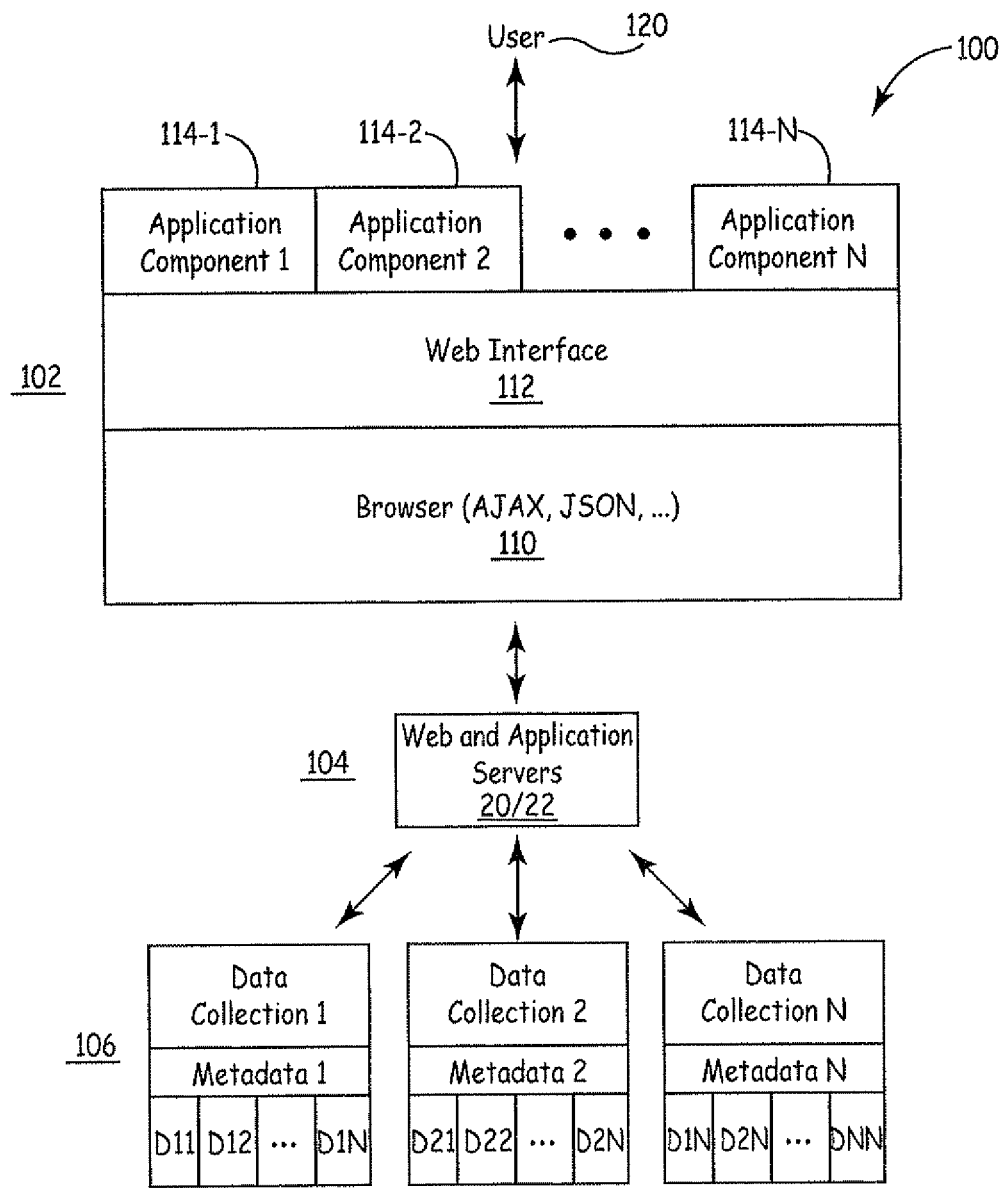
FIG. 2 is a block diagram which illustrates a relationship between an end user and a database shown in FIG. 1.

FIG. 2 is a more detailed block diagram 100 showing client tier 102, server tier 104 and data tier 106. In FIG. 2, the client tier 102 is illustrated as operating as a browser 110. However, any type of application can be used to implement a web interface 112 in which a "work bench" setting is provided. An example of a "work bench" setting includes a unified architecture for implementing the application components 114-1-114-N as well as a standardized user interface 112. This is executed by software in workstation 18. In one particular example, the browser 110 is configured to implement a scriptable language such as AJAX (Asynchronous JavaScript), JAVA, ActiveX, VBScript, or other client/scripting language which may either be compiled or interpreted at the client tier 102 within a browser 110. The browser 110 provides further functionality including functionality in accordance with HTML (Hyper Text Markup Language), XHTML (Extensible Hypertext Markup Language), CSS (Cascading Style Sheet), DOM (Document Object Module), XML (Extensible Markup Language), XSLT (XSL Transformations), XMLHttpRequest, JavaScript, JSON (JavaScript ObjectNotification), etc and/or other standards. A web interface 112 operates in the browser 110 and provides a unified architecture for implementing a plurality of application components 114-1, 114-2 . . . 114-N. The web interface 112 provides a unified architecture allowing the application components 114-1, 114-2 . . . 114-N to operate together using shared resources, communicate with one another and communicate with a consistent interface experience (GUI) to a user 120. The browser 110 communicates with the server tier 104 to receive the web pages (both static and active pages including scripts, etc.) that provide the web interface 112 and the application components 114.1-114-N. Server 22 in server tier 104 communicates with data collections 1, 2, . . . N which are formed by one or more databases implemented in database servers 24 (not shown in FIG. 2) of data tier 106. These databases may be formed by a single database or multiple databases and may be shared across multiple computer systems or locations. Each data collection includes artifacts $D_{11}$, $D_{12}$, . . . $D_{1n}$; $D_{21}$, $D_{22}$, . . . $D_{2N}$; . . . $D_{1N}$, $D_{2N}$, . . . $D_{NN}$. The various artifacts include any type of stored information and comprise, for example, texts, documents, scanned documents or other images, photographs, audio recordings, video recordings, spreadsheets, numerical data, reports, transcripts, exhibits, editorially created headnotes or summaries etc. In addition, these artifacts include any type of relevant data and are not limited to any particular content or format. The metadata 1, 2, . . . N comprises any type of data or information which is used to describe or, comment on or otherwise editorialize the artifacts $D_{11}$-$D_{NN}$. The metadata 1, 2, . . . N information comprises, for example, information that enables linking of various types of artifacts or otherwise group artifacts as desired, relationships between artifacts and metadata or any combination thereof, provides an editorial description of artifacts, provides "key" information to categorize artifacts or other metadata, etc. The databases 24 in the data tier 106 operate in accordance with various database techniques and/or structures known to one of ordinary skill in the art.

The application components 114-1-114-N illustrated in FIG. 2 provide a loosely coupled vertical and horizontal function between other application components. For example, application components 114-1-114-N can share duties between each other (horizontal) as well as depend from another application component 114-1-114-N (vertical) such as using one application component 114-1 to search for artifacts. An example of a horizontal configuration includes a first application component configured to perform a search function used to identify a court action, and a second application component for use in editing headnotes related to the court action found using the search function. An example of a vertical arrangement includes an application component configured to edit headnotes across multiple court actions. In such a configuration, the application component is configured to received the edited headnote information from a user, and implement an embedded secondary application component to search for related court actions having headnotes which should receive similar editing. Multiple application components 114-1-114-N are assembled together to form aggregate, more complex application components. Thus, various functionality of the application components 114-1-114-N are reused between components as desired. Examples include searching functions, histories, cross references, algorithms, etc.

Figure 3:
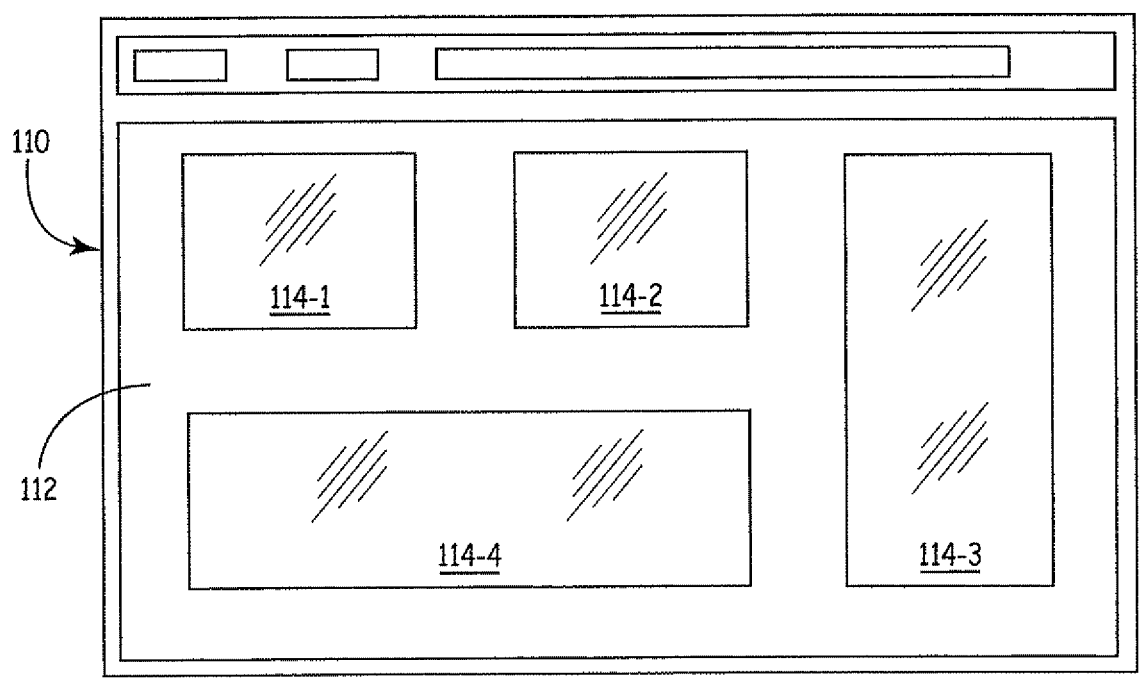
FIG. 3 is a diagram of a web interface for use by a user.

FIG. 3 is a visual example showing application components 114-1 . . . 114-4 implemented in a web interface 112 of a browser 110. Although the various application components 114-1-114-N are illustrated as being displayed simultaneously in a single page of a web browser 110, the various application components 114-1-114-N operate in the background, or may operate in other windows or tabs of the browser 110 and are not necessarily required to provide a visual output to a user. The application components 114-1-114-N are configured to share data between one another. For example, components 114-1-114-N exchange user inputs and other information with one another. In addition, components 114-1-114-N are configured to communicate with the data tier 106 shown in FIG. 2. In this example, the web interface 112 operates within a browser 110. However, the web interface may comprise a standalone software component which operates independently of a browser 110. In either case, the application components 114-1-114-N are used to provide common functionality, for example, searching functions, security, user input, etc. and provide a common look and feel across all of the user interfaces.

Figure 4:
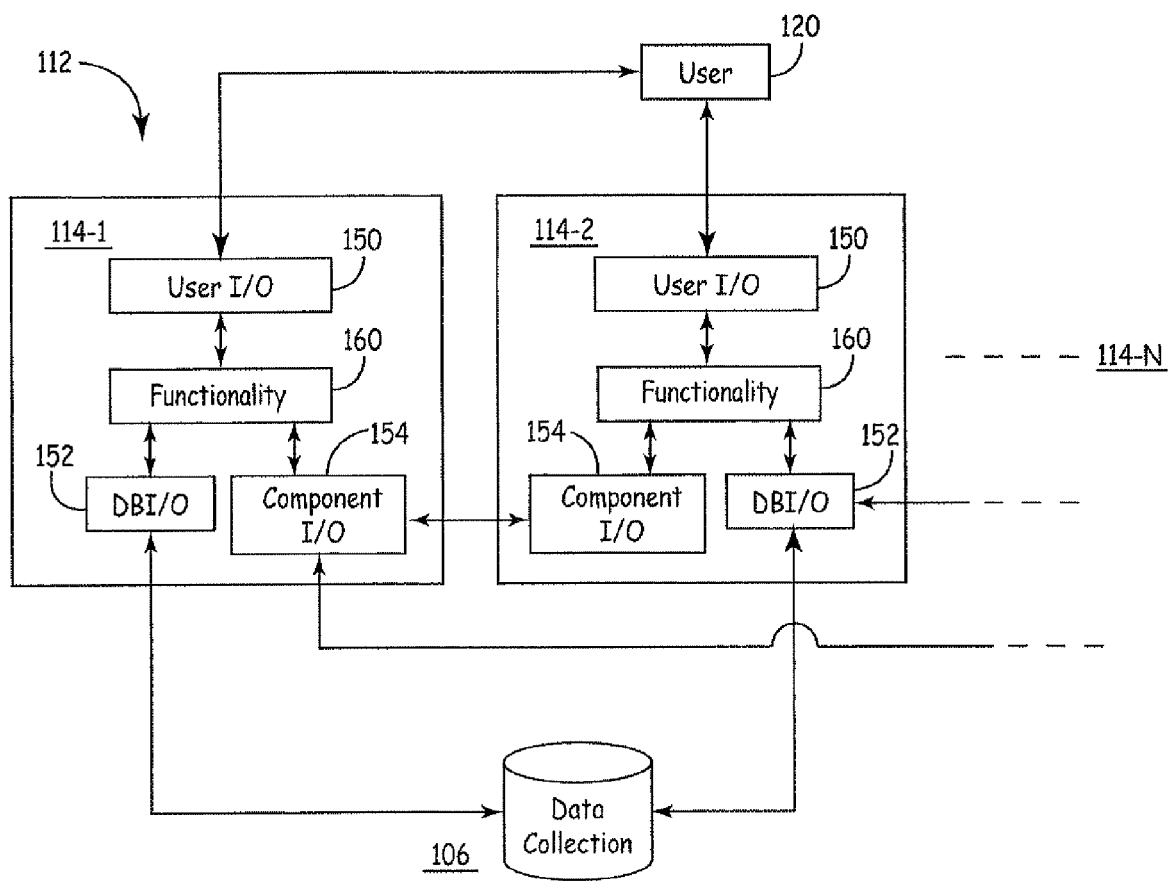
FIG. 4 is a diagram which shows interaction between application components which run in the web interface shown in FIG. 3.

FIG. 4 is a simplified block diagram showing application components 114-1 and 114-2 implemented in the web interface 112. The application components 114-1-114-2 each include a user I/O component 150 which is configured to communicate with a user 120. Typically, the user I/O component 150 comprises a graphical user interface 112 which visually displays information to user 120 and receives information from user 120 using a standard device such as keyboard, touch screen, mouse, etc. Each application component 114-1-114-2 also includes a database access (I/O) component 152 configured to communicate with a data collection of the data tier 106. Additionally, each application component 114-1-114-2 includes an application communication component 154 identified as "Component I/O" in FIG. 4. The application communication components 154 are configured to communicate data or a function of the data (i.e. editorial content) between application components 114-1-114-N. An example of a function of the data is the user clicking an "ACCEPT" button, then the communication is information to populate fields about the case (name, parties, keynotes, etc), rather than the communication of clicking of the "ACCEPT" button. Other communications include, for example, a direct communication, a broadcast communication, a polling technique, a configuration in which all other communications are received from other application components, etc. In some communication techniques, an application component 114-1-114-N includes a unique, partially unique, or shared identifier which provides an address for use in communication. The application components 114-1-114-2 also include a functionality component 160 which provides some type of functionality to the application components 114-1-114-2. The particular operation of functionality component 160 is configured as desired. Examples include search functions, functions which automate data entry, functions which are used to identify related data artifacts, functions which identify errors in data entry such as a spell check function, and functions which are used to simplify data entry (for example, a function which simplifies the entry of metadata, by identifying a particular court or jurisdiction from which the artifact arises). Additional examples include functions which show a history related to a particular artifact and functions which provide an automatic link between potentially related data artifacts, automatic calendaring functions, etc. Any number of functionality components 160 are implemented in an application component 114-1-114-2 and functionality components 160 operate independently or are made to operate in an interdependent manner. Although only two application components 114-1-114-2 are illustrated in FIG. 4, any number of application components 114-1-114-N are implemented within the web interface 112.

During operation, information is displayed to user 120 for use in an editorial review process in which artifacts in the data collection are subjected to editorial review and editorialized, as desired. The artifacts are edited directly. However, in some instances the editing is performed on the metadata associated with an artifact. In these instances, in response to the display, the user 120 selectively responds through the user interface component 150. The response includes any type of editorial response including, for example, accepting the displayed information without change, modifying the displayed information, modifying or adding metadata related to an artifact stored in the data collection of the data tier 106, linking various artifacts or metadata together, modifying the function performed by the functionality component 160, etc. Turning to a specific example, a first application component 114-1 can provide a search function used to locate an artifact. The user selects a located artifact and views it and/or its metadata in a second application component 114-2. The user selects a field for editing which then populates a third application component 114-3 with information such as metadata which is revised. Any changes in the metadata are communicated to a fourth application component 114-4 which is configured to identify related artifacts stored in a data collection 106. The editorial changes are also used to modify the metadata stored in the data collection 106. Thus, the burden on the user to enter data is reduced.

Figure 5:
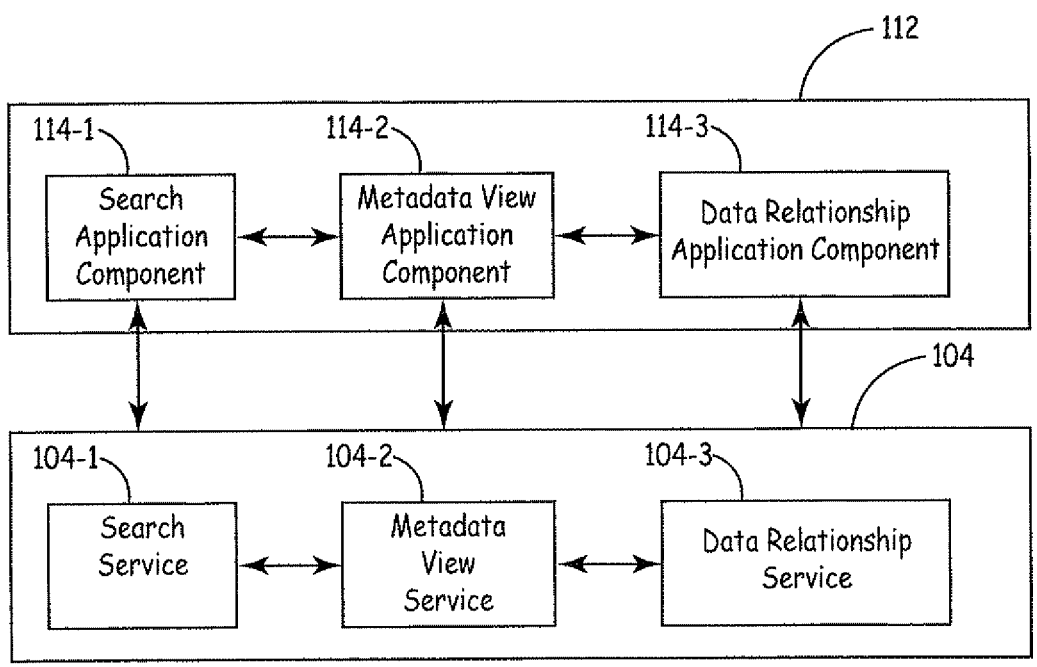
FIG. 5 is a diagram showing a relationship between application components and services run on a database server.

FIG. 5 is a block diagram showing one example configuration of application components 114-1-114-3. In the configuration of FIG. 5, three different application components are illustrated 114-1, 114-2, 114-3. A search application component 114-1, a metadata view component 114-2, and a data relationship application component 114-3 are provided. Each application component 114-1, 114-2, 114-3 provides a graphical user interface user 120 illustrated in FIG. 4. As illustrated in FIG. 5, application components 114-1-114-3 are configured to share data and communicate with other application components. Further, the application components 114-1-114-3 interact with servers 20 and 22 illustrated in FIG. 2. Servers 22 operate on data servers 24 of the data tier 106 (not shown in FIG. 5). The server tier 104 is configured to provide various services which are accessible by application components 114-1-114-N. In the example of FIG. 5, a search service 104-1 is provided. The search service 104-1 searches for and retrieves various data (artifacts) in the data collections 106 illustrated in FIG. 2. The searching functionality of the service is implemented using any appropriate search technique. A metadata view service 104-2 is also provided which is used to review metadata from the data collections illustrated in FIG. 2. The metadata view application component 114-2 accesses the metadata view service 104-2 such that a user views the metadata. A data relationship service 104-3 is provided which, in one example, is used to identify relationships between artifacts $D_{11}, D_{12}, \ldots D_{1n}; D_{21}, D_{22}, \ldots D_{2N}; D_{1N}, D_{2N}, \ldots D_{NN}$ stored in the database 24. For example, in the case of a court action, the data relationship service 104-3 is configured to identify information arising from a particular lawsuit.

The configuration shown in FIG. 5 allows a user 120 to search for stored data, view metadata and view or modify a relationship between two sets of retrieved data. In an exemplary embodiment, stored documents all having a relationship to a lawsuit are retrieved by a user 120. The user 120 may view each relationship and either approve the relationship, delete the relationship (i.e. a particular legal document may be associated with an incorrect lawsuit or court matter), or modify the relationship. This process of editorializing the data is achieved using the application components 114-1-114-N which operate within the web interface 112.

Figure 6:
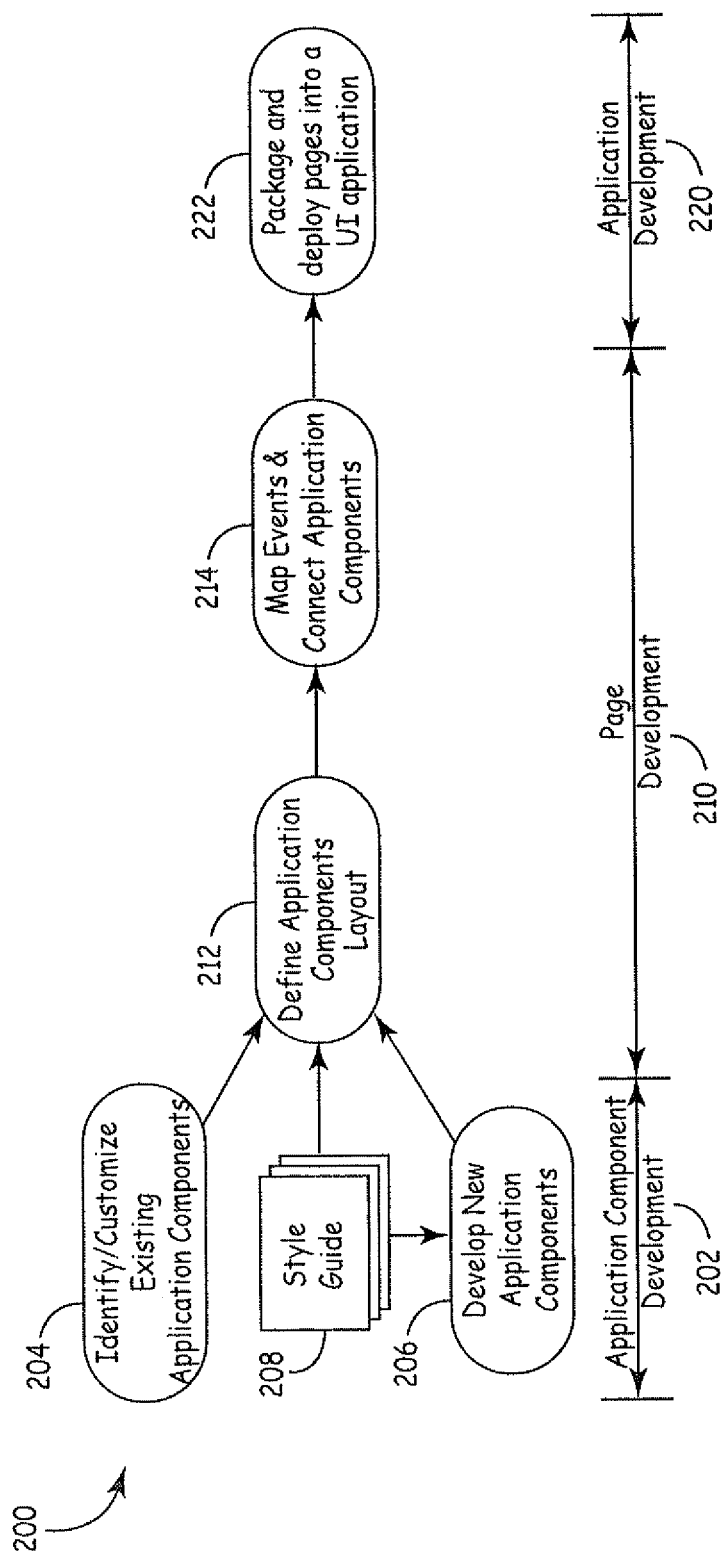
FIG. 6 is a flow chart showing steps in development of an application component.

Especially for developers, the ability to share functionality between application components provides a simplified and streamlined process for implementing new application components. FIG. 6 shows a flow diagram 200 of steps involved with a developer implementing a new page or grouping of application components 114-1-114-N. During an application component development phase 202, a developer, having determined what functions should be performed by an ultimate application, identifies or customizes existing application components 114-1-114-N at step 204. If a desired functionality is not available through an existing application component, the developer develops a new application component at step 206. This new application component is developed in accordance with a style guide 208 which ensures that all application components are configured with a common user interface 112 and the ability to operate with one another as well as within the framework provided by the web interface 112. During a page development phase 210, the layout of the selected application components on a particular page is defined at step 212. At step 214 events are mapped between application components and application components are coupled together as desired. In other words, how the data shared between application components is defined and how the application components interact with one another is defined. During an application development phase 220, the developer packages and deploys the various pages into a user interface application 112 (i.e., a web interface) at step 222. The resulting code can then be stored in the server tier 104 shown in FIG. 1 for ultimate deployment to a work station 18 in the work station tier 102.

As used herein, application components are capable of providing a user interface component that implements a loosely coupled "vertical" function. In other words, the application component provides functionality such that multiple application components can be assembled to form more complex application components. Examples of application components include reusable components such as a search function, a specific type of lookup function such as a capability to look up a judicial authority, or an inbox function for receiving data. An example of a more specialized application component is an application component which provides a historical relationship view between artifacts. A "page" can contain any number of application components. A page can comprise, for example, a page or a tab within a browser which provides a web interface, or a standalone application. The page is used to assemble application components onto single or multiple screens and, optionally, introduce coupling between application components. For example, the entire user interface needed for a tool which summarizes data can be implemented in a single page.

A web interface such as browser or other stand alone application is configured to implement one or more pages. This allows multiple pages which are related to be grouped together and may optionally introduce coupling between pages such that data from one page can be exchanged with data from another page using a communication component 154 as described above. Thus, a web interface is capable of providing a "work bench" in which related application components are assembled together to provide a platform in which a related group of application components are provided and operate as "tools" for use by a user. The web interface can implement common functionalities such as security and supports a common look and feel across multiple user interfaces.

The description includes many terms with meanings derived from their usage in the art or from their use within the context of the description. However, as a further aid, the following exemplary definitions are presented. The term "document" or "artifact" refers to any addressable collection or arrangement of machine-readable data. The term "database" includes any logical collection or arrangement of artifacts and may include metadata.

Although the present invention has been described with reference to preferred embodiments, workers skilled in the art will recognize that changes may be made in form and detail without departing from the spirit and scope of the invention. Various types of communication techniques can be used to communicate data between application components. For example, a communication component can "listen" to all communications and only respond to communications which are directed to it, for example, by an addressing scheme, polling techniques can be used, event driven communication techniques can be implemented as well as timed based communications. If addressing techniques are employed, the application components, or at least their internal communication components, should have an address associated therewith. The address may be unique, or may be shared between components as desired.

What is claimed is:

1. A system for use in editorial review of stored information, wherein the stored information is maintained in at least one database, the system comprising:

at least one workstation computer, wherein the at least one workstation computer comprises a browser; and at least one web server communicatively connected to the at least one workstation computer through a network connection, wherein the at least one web server is configured to provide a web interface adapted to run in the browser, and wherein the web interface is configured to implement a work bench, the work bench comprising a platform that provides a plurality of related application components that are assembled together and configured to operate as tools for use by a user to perform editorial review of stored information, the plurality of application components comprising:

a first application component and a second application component each adapted to run simultaneously in the web interface;

the first application component comprising (1) a first user interface component configured to present a first portion of the stored information to the user and to receive editorial content related to the first portion of the stored information from the user, and (2) a first communication component configured to communicate data to the second application component in response to the first user interface component receiving the editorial content from the user, wherein the data comprises at least one of the editorial content and a function of the editorial content; and the second application component comprising (1) a second user interface component configured to present a second portion of the stored information to the user and (2) a second communication component configured to receive the data from the first communication component, wherein the first communication component communicates with the second communication component through the web interface, wherein the web interface comprises at least one event mapping between the first communication component and the second communication component.

2. The system of claim 1 wherein the at least one database includes metadata and the second application component further comprises a functionality component configured to modify the metadata based upon the editorial content received from the user.

3. The system of claim 1 wherein the at least one database includes a first data collection comprising a plurality of artifacts related to one or more court cases and a second data collection comprising metadata related to the plurality of artifacts.

4. The system of claim 3, wherein the first application component comprises a first database access component configured to access the first data collection, and wherein the second application component comprises a second database access component configured to access the second data collection.

5. The system of claim 1 wherein the first and second application components are configured to run on a single webpage.

6. The system of claim 1 wherein the first and second application components are configured to run within tabs of the browser.

7. The system of claim 1 wherein the first and second application components are configured to run in separate windows of the browser.

8. The system of claim 1 wherein the first application component includes a first functionality component and wherein the first functionality component comprises a search function configured to search the stored information maintained in the at least one database.

9. The system of claim 8, wherein the second application component includes a second functionality component and wherein the second functionality component is configured to automate the editorial review of the stored information maintained in the at least one database by identifying related artifacts stored in the at least one database, wherein the editorial content is used to modify additional metadata associated with the identified related artifacts.

10. The system of claim 1, wherein the first application component includes a functionality component and wherein the functionality component is configured to display metadata to the user.

11. The system of claim 1, wherein the first application component includes a functionality component and wherein the functionality component comprises a data relationship component configured to identify relationships between data elements stored in the at least one database.

12. The system of claim 1, the second application component further comprising:

a database communication component adapted to communicate with the at least one database containing the stored information in response to receiving the data from the first application component.

13. The system of claim 1, further comprising at least one application server that provides a service that interfaces with the at least one database, wherein the at least one web server interacts with the at least one application server based on interaction between the user and the web interface, and wherein the implementation of the first and second application components within the web interface allows for subsequent incorporation of a third application component into the web interface without modification of software running on the at least one application server.

14. The system of claim 1, wherein the first communication component includes a first unique address, and wherein the second communication component includes a second unique address, the first and second unique addresses facilitating communication between the first and second communication components, wherein the second communication component is configured to (1) listen to all communications from other application components and (2) respond only to communications that are directed to the second communication component.

15. A method for development of a system for editorial review of stored information related to at least one legal proceeding, wherein the stored information is maintained in at least one database, the method comprising:

developing a first application component using at least one processor, the first application component comprising: (1) a first user interface component configured to present a first portion of the stored information to a user and to receive editorial content related to the first portion of the stored information from the user, (2) a first functionality component configured to provide a first functionality associated with editorial review of the first portion of the stored information, and (3) a first communication component configured to communicate data to a second application component in response to the first user interface component receiving the editorial content from the user, wherein the data comprises at least one of the editorial content and a function of the editorial content;

developing the second application component using the at least one processor, the second application component comprising: (1) a second user interface component configured to present a second portion of the stored information to the user, (2) a second functionality component configured to provide a second functionality associated with editorial review of the second portion of the stored information, and (3) a second communication component configured to receive the data from the first communication component;

developing a webpage by using the at least one processor to create a hypertext markup language (HTML) page, wherein developing the webpage comprises: (1) defining a layout of the first and second user interface components on the webpage, and (2) defining a manner in which the data is communicated between the first application component and the second application component;

packaging the webpage into a web interface, using the at least one processor, wherein the web interface is configured to implement a work bench, the work bench comprising a platform that provides the first and second application components as tools for use by the user to perform editorial review of stored information, wherein the web interface is further configured to: (1) run in a browser of a workstation computer, and (2) implement the first and second application components simultaneously, wherein the first communication component communicates with the second communication component through the web interface; and storing the web interface on a web server, wherein the web server is configured to provide the web interface to the workstation computer.

16. A system for use in editorial review of stored information, wherein the stored information is maintained in at least one database, the system comprising:

at least one workstation computer, wherein the at least one workstation computer comprises a browser; and at least one web server communicatively connected to the at least one workstation computer through a network connection, wherein the at least one web server is configured to provide a web interface adapted to run in the browser, and wherein the web interface is configured to implement a work bench, the work bench comprising a platform that provides a plurality of related application components that are assembled together and configured to operate as tools for use by a user to perform editorial review of stored information, the plurality of application components comprising:

a first application component and a second application component each adapted to run simultaneously in the web interface, wherein the second application component is configured to edit metadata across multiple groups of artifacts;

the first application component comprising (1) a first user interface component configured to present a first portion of the stored information to the user and to receive a first input from the user, and (2) a first communication component configured to communicate data to the second application component in response to the first user interface component receiving the first input from the user, wherein the data comprises at least one of the first input and a function of the first input; and the second application component comprising (1) a second user interface component configured to present a second portion of the stored information to the user and to receive a second input from the user, wherein the second input comprises editorial content, and (2) a second communication component configured to receive the data from the first communication component, wherein the first communication component communicates with the second communication component through the web interface, wherein the web interface comprises at least one event mapping between the first communication component and the second communication component.

17. The system of claim 16, the stored information comprising a plurality of artifacts, wherein each of the plurality of artifacts is associated with one of a plurality of court cases, wherein the editorial content is associated with a first court case, and wherein the second application component is configured to implement a third application component configured to search for a second court case having associated metadata which should receive similar editorial content.

18. The system of claim 17, wherein the second and third application components are related by a vertical arrangement.

19. The system of claim 18, wherein the third application component is embedded within the second application component.

20. The system of claim 17, wherein the third application component is configured to operate without providing a visual output to the user.

* * * * *